United States Patent
Yun et al.

(10) Patent No.: US 9,185,396 B2
(45) Date of Patent: Nov. 10, 2015

(54) LENS MODULE AND DISPLAY APPARATUS HAVING THE SAME

(75) Inventors: Hae-Young Yun, Suwon-si (KR);
Ung-Gyu Min, Namyanju-si (KR);
Seung-Hoon Lee, Hwaseong-si (KR);
Seung-Jun Jeong, Asan-si (KR);
Kyoung-Ju Shin, Hwaseong-si (KR);
Jin-Hwan Kim, Suwon-si (KR);
Kyung-Ho Jung, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 642 days.

(21) Appl. No.: 13/345,951

(22) Filed: Jan. 9, 2012

(65) Prior Publication Data
US 2012/0300042 A1 Nov. 29, 2012

(30) Foreign Application Priority Data
May 23, 2011 (KR) .................... 10-2011-0048286

(51) Int. Cl.
*H04N 13/04* (2006.01)
*G02F 1/13* (2006.01)
*G02B 27/22* (2006.01)
*G02F 1/1343* (2006.01)
*G02F 1/29* (2006.01)

(52) U.S. Cl.
CPC .......... *H04N 13/0404* (2013.01); *G02F 1/1343* (2013.01); *G02B 27/2214* (2013.01); *G02F 2001/294* (2013.01)

(58) Field of Classification Search
CPC .......... H04N 13/0404; H04N 13/0497; H04N 13/0454; H04N 13/0422; H04N 13/0406; H04N 13/042
USPC .................................... 348/42–60
See application file for complete search history.

(56) References Cited

U.S. PATENT DOCUMENTS

| | | | |
|---|---|---|---|
| 7,894,005 B2 * | 2/2011 | Kim | 349/15 |
| 8,482,597 B2 * | 7/2013 | Son et al. | 348/42 |
| 8,564,755 B2 * | 10/2013 | Chen et al. | 349/200 |
| 8,587,556 B2 * | 11/2013 | Luo | 345/174 |
| 8,614,771 B2 * | 12/2013 | Hong et al. | 349/15 |
| 8,692,971 B2 * | 4/2014 | Chiu | 349/200 |
| 2008/0297594 A1 * | 12/2008 | Hiddink et al. | 348/59 |
| 2009/0109154 A1 * | 4/2009 | Hong et al. | 345/87 |
| 2009/0153653 A1 * | 6/2009 | Lee et al. | 348/59 |
| 2009/0167846 A1 * | 7/2009 | Niioka et al. | 348/54 |
| 2010/0195203 A1 * | 8/2010 | Zuidema et al. | 359/463 |
| 2012/0075434 A1 * | 3/2012 | Kim et al. | 348/51 |
| 2012/0154556 A1 * | 6/2012 | An et al. | 348/51 |

* cited by examiner

*Primary Examiner* — Gelek W Topgyal
(74) *Attorney, Agent, or Firm* — F. Chau & Associates, LLC

(57) ABSTRACT

A lens module includes a lens panel and a lens driving part. The lens panel includes a first substrate, a second substrate and a liquid crystal layer. The first substrate includes first electrodes and second electrodes alternately disposed thereon that partially overlap each other and are electrically insulated from each other. The second substrate is opposite to the first substrate. The liquid crystal layer is disposed between the first substrate and the second substrate. The lens driving part provides a substantially equal voltage to both ends of each of the first and second electrodes.

20 Claims, 5 Drawing Sheets

LENS MODULE AND DISPLAY APPARATUS HAVING THE SAME

PRIORITY STATEMENT

This application claims priority under 35 U.S.C. §119 from Korean Patent Application No. 2011-48286, filed on May 23, 2011 in the Korean Intellectual Property Office (KIPO), the contents of which are herein incorporated by reference in their entirety.

BACKGROUND

1. Technical Field

Exemplary embodiments of the present disclosure are directed to a lens module and a display apparatus having the lens module. More particularly, exemplary embodiments of the present disclosure are directed to a lens module for a display apparatus that can display a 3-dimensional (3D) stereoscopic image and a display apparatus having the lens module.

2. Description of the Related Art

In general, a display apparatus displays a 2-dimensional (2D) image. Recently, due to increased demand for 3-dimensional (3D) stereoscopic images for films, games, etc., stereoscopic image display apparatuses have been developed that can display a 3D stereoscopic image.

A 3D stereoscopic image may be displayed by exploiting the binocular parallax of both eyes. Methods of displaying a 3D stereoscopic image may be classified as either shutter-glasses type methods or auto-stereoscopic type methods. Auto-stereoscopic type methods include barrier type methods, lenticular type methods, liquid crystal lens type methods, etc.

A lenticular type method uses a convex lens or a Fresnel lens. A Fresnel lens is thinner than a convex lens. A Fresnel lens has a plurality of circular arcs on its surface and refracts light through the circular arcs thereof.

Liquid crystal directors may be controlled by an electric field, from which a liquid crystal lens may be fabricated. A liquid crystal lens includes an upper substrate, a lower substrate and a liquid crystal layer between the upper substrate and the lower substrate. A liquid crystal director having a liquid crystal layer may be challenging to control, and may have a slow response time with respect to mode changes. Thus, a display apparatus having a liquid crystal lens may be slow in switching between a 2D mode and a 3D mode.

SUMMARY

Exemplary embodiments of the present disclosure provide a lens module for a display apparatus of an auto-stereoscopic type capable of quickly switching between a 2-dimensional (2D) mode and a 3-dimensional (3D) stereoscopic mode.

Exemplary embodiments of the present disclosure also provide a display apparatus having the lens module.

According to an exemplary embodiment, a lens module includes a lens panel and a lens driving part. The lens panel includes a first substrate, a second substrate and a liquid crystal layer. The first substrate includes first electrodes and second electrodes alternately disposed thereon that partially overlap each other and are electrically insulated from each other. The second substrate is opposite to the first substrate. The liquid crystal layer is disposed between the first substrate and the second substrate. The lens driving part provides a substantially equal voltage to both ends of each of the first and second electrodes.

In an exemplary embodiment, the first substrate may include a lens area and a peripheral area surrounding the lens area. The first and second electrodes may be disposed in the lens area, and extend in a direction inclined with respect to a side of the first substrate.

In an exemplary embodiment, the lens driving part may be disposed in the peripheral area. The lens driving part may include first and second lens driving circuits connected to a first end of each of the first and second electrodes and third and fourth lens driving circuits connected to a second end of each of the first and second electrodes opposite to the first end.

In an exemplary embodiment, the first substrate may further include a plurality of connect lines disposed between the first and second electrodes and the lens driving part that transmit the voltage to both ends of each of the first and second electrodes. The connect lines may provide differing voltages to the first and second electrodes in a 3D stereoscopic display mode, and a common voltage to each of the first and second electrodes in a 2D display mode.

In an exemplary embodiment, the first substrate may further include a base substrate, a first insulating layer disposed on the base substrate, a second insulating layer disposed between the first electrode and the second electrode, and a first alignment layer disposed over the first and second electrodes. The second substrate may include a second alignment layer facing the first alignment layer. Each of the first and second alignment layers may be rubbed in a direction substantially parallel with the first and second electrodes. The lens panel may further include a first polarizing plate disposed under the first substrate and a second polarizing plate disposed over the second substrate. Each of the first and second polarizing plates may have a polarizing axis substantially parallel with the first and second electrodes.

In an exemplary embodiment, the first and second electrodes may form a unit lens. The unit lens may include a plurality of refractive areas. Widths of the first and second electrodes may increase as the refractive areas become closer to a center of the unit lens from an edge of the unit lens.

In an exemplary embodiment, the first and second electrodes may form a unit lens. The unit lens may include a plurality of refractive areas. The first and second electrodes may have a substantially same width. The number of the first and second electrodes may decrease as the refractive areas become closer to an edge of the unit lens from a center of the unit lens.

According to another exemplary embodiment, a display apparatus includes a panel module and a lens module. The panel module displays either a 2-dimensional (2D) image or a 3-dimensional (3D) stereoscopic image. The lens module is disposed over the panel module and includes a lens panel and a lens driving part. The lens module includes a first substrate having first electrodes and second electrodes alternatively disposed thereon, a second substrate opposite to the first substrate, and a liquid crystal layer disposed between the first substrate and the second substrate. The first and second electrodes partially overlap each other and are electrically insulated from each other. The lens driving part provides a substantially equal voltage to both ends of each of the first and second electrodes.

In an exemplary embodiment, the display apparatus may further include a light source module and a controller. The light source module may be disposed under the panel module and provides light to the panel module. The controller may be connected to the panel module, the lens module and the light source module and controls the panel module, the lens module and the light source module.

In an exemplary embodiment, the controller may include a timing controlling part, a lens controlling part and a light source controlling part. The timing controlling part may transmit either the 2D image or the 3D stereoscopic image to the panel module. The lens controlling part may transmit an ON-voltage (VON) to the lens module when the 2D image data is transmitted to the panel module, and transmit an OFF-voltage (VOFF) to the lens module when the 3D stereoscopic image data is transmitted to the panel module. The light source controlling part may transmit a first luminance control signal to the light source module when VOFF is transmitted to the lens module, and transmit a second luminance control signal to the light source module when VON is transmitted to the lens module.

In an exemplary embodiment, the lens driving part may generate a plurality of voltages having different levels based on VON.

In an exemplary embodiment, the first luminance control signal may control the light source module to provide light of a first luminance. The second luminance control signal may control the light source module to provide light of a second luminance.

In an exemplary embodiment, the panel module may include a plurality of pixels, each including a switching element, a pixel electrode electrically connected to the switching element and a color filter facing the pixel electrode.

In an exemplary embodiment, the first and second electrodes may extend in a direction inclined with respect to a side of the first substrate, and form a unit lens. The unit lens may include a plurality of refractive areas. Widths of the first and second electrodes may increase as the refractive areas become closer to a center of the unit lens from an edge of the unit lens.

In an exemplary embodiment, the first and second electrodes may extend in a direction inclined with respect to a side of the first substrate, and form a unit lens. The unit lens may include a plurality of refractive areas. The first and second electrodes may have a same width. The number of the first and second electrodes may decrease as the refractive areas become closer to an edge of the unit lens from a center of the unit lens.

According to another exemplary embodiment, a lens module includes a lens panel. The lens panel includes a first substrate having first electrodes and second electrodes alternately disposed thereon, a second substrate opposite to the first substrate, and a liquid crystal layer disposed between the first substrate and the second substrate. The first and second electrodes partially overlap each other and are electrically insulated from each other, extend in a direction inclined with respect to a side of the first substrate, and form a unit lens that includes a plurality of refractive areas.

In an exemplary embodiment, the first substrate includes a lens area and a peripheral area surrounding the lens area. The first and second electrodes are disposed in the lens area. The lens module further includes a lens driving part disposed in the peripheral area that provides a substantially equal voltage to both ends of each of the first and second electrodes.

In an exemplary embodiment, the first substrate further includes a plurality of connect lines disposed between the first and second electrodes and the lens driving part that transmit the voltage to both ends of each of the first and second electrodes. The connect lines provide differing voltages to the first and second electrodes in a 3D stereoscopic display mode, and a common voltage to each of the first and second electrodes in a 2D display mode.

In an exemplary embodiment, widths of the first and second electrodes increase as the refractive areas become closer to a center of the unit lens from an edge of the unit lens.

In an exemplary embodiment, the first and second electrodes have a substantially same width, and the number of the first and second electrodes decreases as the refractive areas become closer to an edge of the unit lens from a center of the unit lens.

According to a lens module and a display apparatus having the lens module, the display apparatus includes a lens panel having a refractive index of a Fresnel lens, so that the display apparatus may quickly change between a 2D mode and a 3D stereoscopic mode.

First and second electrodes of a unit lens are driven in a dual bank, to decrease RC delay according to resistances of the first and second electrodes of the unit lens.

In addition, a same voltage may be applied to both ends of each of the first and second electrodes of the unit lens, to decrease the RC delay according to resistances of the first and second electrodes of the unit lens.

In addition, a first brightness is provided in a 2-dimensional (2D) mode and a second brightness different from the first brightness is provided in a 3-dimensional (3D) mode, to improve display quality.

In addition, the unit lens is inclined with respect to side of a display panel, to prevent moirépatterns.

DETAILED DESCRIPTION OF EXEMPLARY EMBODIMENTS

Hereinafter, exemplary embodiments will be explained in detail with reference to the accompanying drawings.

Figure 1:
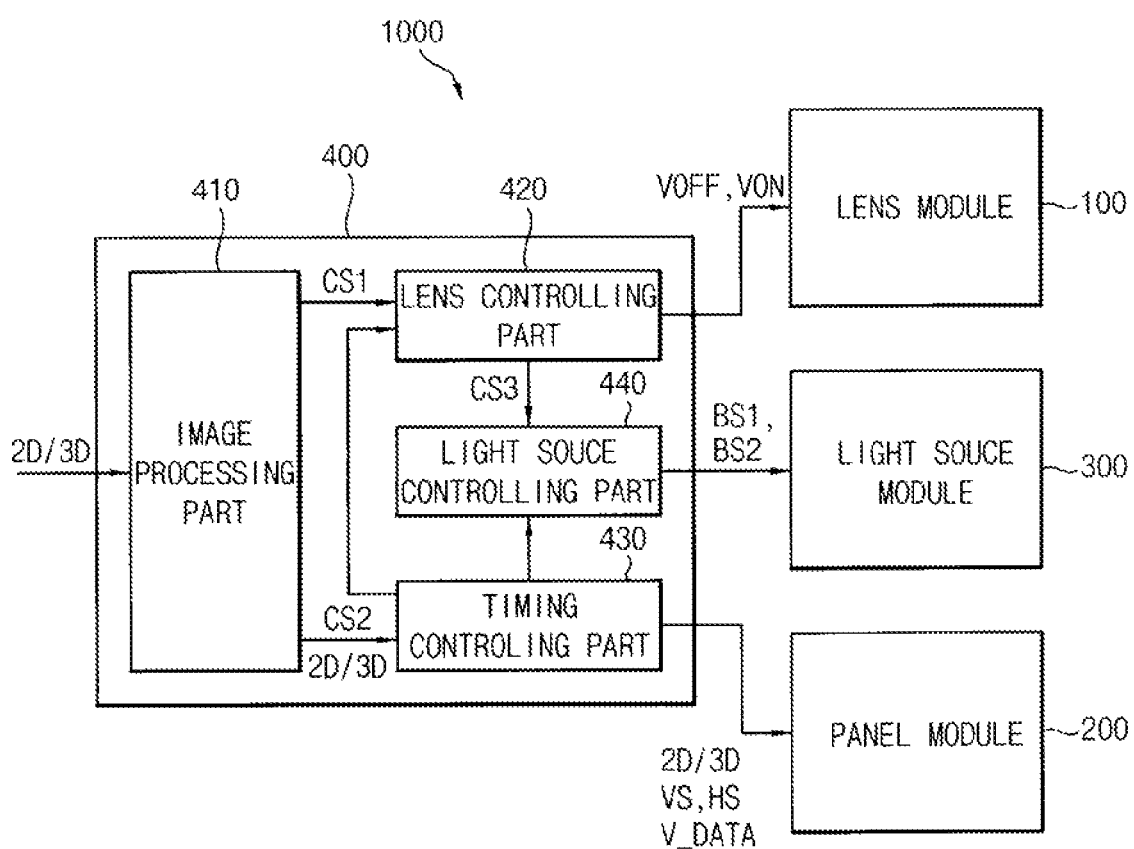
FIG. 1 is a block diagram of a display apparatus according to an exemplary embodiment of the present disclosure.
Figure 2:
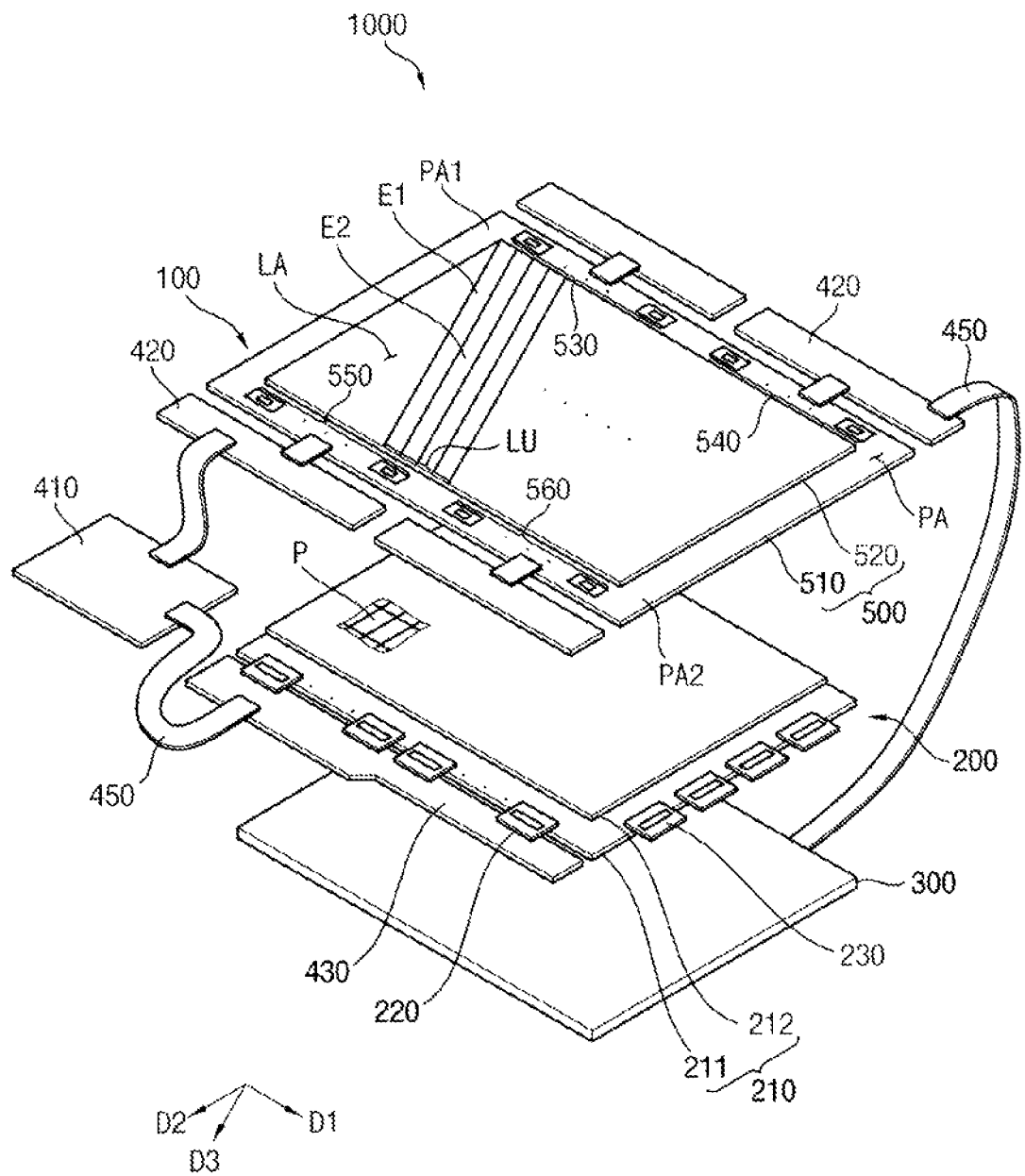
FIG. 2 is an exploded perspective view illustrating a display apparatus of FIG. 1.

FIG. 1 is a block diagram of a display apparatus according to an exemplary embodiment of the present disclosure. FIG. 2 is an exploded perspective view of a display apparatus of FIG. 1.

Referring to FIG. 1 and FIG. 2, a display apparatus 1000 according to the present exemplary embodiment includes a lens module 100, a panel module 200, a light source module 300 and a controller 400.

The lens module 100 includes a lens panel 500. The lens panel 500 includes a long side substantially parallel with a first direction D1 and a short side substantially parallel with a second direction D2. The lens panel 500 includes a first substrate 510, a second substrate 520 opposite to the first substrate 510 and a liquid crystal layer (not shown) disposed between the first substrate 510 and the second substrate 520. The first substrate 510 includes a lens area LA and a peripheral area PA surrounding the lens area LA.

The first substrate 510 includes a plurality of first electrodes E1 and a plurality of second electrodes E2, and the second substrate 520 includes a common electrode (not shown) facing the first and second electrodes E1 and E2. The first and second electrodes E1 and E2, the common electrode, the liquid crystal layer disposed between the first and second electrodes E1 and E2, and the common electrode form a unit lens LU. The first and second electrodes E1 and E2 are alternately disposed on the first substrate 510, and extend in a third direction D3 crossing each of the first and second directions D1 and D2. For example, the first and second electrodes E1 and E2 extend in a direction inclined with respect to either side of the first substrate 510.

The lens module 100 also includes a lens driving part disposed in the peripheral area PA on the first substrate 510. For example, the lens driving part may include first and second lens driving circuits 530 and 540 disposed in a first peripheral area PA1 on the first substrate 510, and third and fourth lens driving circuits 550 and 560 disposed in a second peripheral area PA2 opposite to the first peripheral area PA1. In a large display apparatus, each of the first, second, third and fourth lens driving circuits 530, 540, 550 and 560 may further include a plurality of circuits. In one exemplary, non-limiting embodiment, each of the first, second, third and fourth lens driving circuits 530, 540, 550 and 560 may further include eight circuits, for a total of thirty-two driving circuits.

The first and second lens driving circuits 530 and 540 are electrically connected to a first end of each of the first and second electrodes E1 and E2 through bus lines and connect lines described below, and the third and fourth lens driving circuits 550 and 560 are electrically connected to a second end of each of the first and second electrodes E1 and E2 opposite to the first end through the bus lines and the connect lines. Thus, each of the first and second electrodes E1 and E2 are dual-driven by the first, second, third and fourth lens driving circuits 530, 540, 550 and 560.

A substantially equal voltage may be applied to the first and second ends of each of the first and second electrodes E1 and E2, to minimize a voltage drop across the first and second electrodes E1 and E2.

The panel module 200 includes a display panel 210, data driving circuits 220 and gate driving circuits 230. The display panel 210 includes an array substrate 211, an opposite substrate 212 opposite to the array substrate 211 and a liquid crystal layer (not shown) disposed between the array substrate 211 and the opposite substrate 212.

The array substrate 211 includes gate lines (not shown), data lines (not shown) crossing the gate lines, switching elements (not shown) that include gate electrodes connected to the gate lines, source electrodes connected to the data lines, and drain electrodes, and pixel electrodes (not shown) connected to the switching elements. The opposite substrate 212 includes an opposite electrode (not shown) facing the pixel electrodes. A pixel electrode, the opposite electrode and the liquid crystal layer disposed between the pixel electrode and the opposite electrode form a pixel P. The data driving circuits 220 and the gate driving circuits 230 drive the pixel P.

The light source module 300 is disposed under the panel module 200, and provides light to the panel module 200. The light source module 300 includes light sources (not shown) emitting light. The light source module 300 may be classified as either a direct-illumination type or an edge-illumination type according to a position of the light source. For an edge-illumination type, the light source module 300 may further include a light guide plate. In addition, the light source module 300 may be synchronized with the panel module 200 to be driven in a 2-dimensional (2D) mode or in a 3-dimensional (3D) stereoscopic mode.

The controller 400 includes an image processing part 410, a lens controlling part 420, a timing controlling part 430 and a light source controlling part 440. The lens controlling part 420 may include one or more printed circuit boards (PCBs) connected to each of the first, second, third and fourth lens driving circuits 530, 540, 550 and 560 through connecting parts 450, which may be flexible printed circuit boards (FPC). The first, second, third and fourth lens driving circuits 530, 540, 550 and 560 may receive a driving signal driving the unit lenses LU from the lenses controlling part 420.

The timing controlling part 430 may include one or more PCBs connected to the data driving circuits 220. The data driving circuits 220 may receive a driving signal driving the pixel P from the timing controlling part 430.

The image processing part 410 may be separately formed from the lens controlling part 420, the timing controlling part 430 and the light source controlling part 440. The image processing part 410 may be connected to the lens controlling part 420, the timing controlling part 430 and the light source controlling part 440 through the connection parts 450. Alternatively, the image processing part 410 may be integrally formed with the timing controlling part 430.

Although FIG. 2 shows the image processing part 410 connected to two lens controlling parts of the plurality of lens controlling parts 420, the image processing part 410 may be respectively connected to all of the plurality of lens controlling parts.

The image processing part 410 may receive either a 2D image (2D) or a 3D stereoscopic image (3D) from an external device such as a graphics processor. When the image processing part 410 receives a 2D image, the display apparatus 1000 is driven in a 2D mode, and when the image processing part 410 receives a 3D stereoscopic image, the display apparatus 1000 is driven in a 3D stereoscopic mode. The image processing part 410 generates first and second control signals CS1 and CS2 according to the display modes.

The image processing part 410 transmits the first control signal CS1 to the lens controlling part 420. The first control signal CS1 determines whether or not the lens part 500 is driven as a Fresnel lens. For example, when the display apparatus 1000 changes from a 2D mode into a 3D stereoscopic mode, the first control signal CS1 may control the lens controlling part 420 to transmit an ON-voltage VON to the lens panel 500. However, when the display apparatus 1000 changes from a 3D stereoscopic mode into a 2D mode, the first control signal CS1 may control the lens controlling part 420 to transmit an OFF-voltage VOFF to the lens panel 500.

In addition, the image processing part 410 transmits the second control signal CS2 and either a 2D image or a 3D stereoscopic image to the timing controlling part 430. The second control signal CS2 determines whether the panel module 200 displays a 2D image or a 3D stereoscopic image.

The lens controlling part 420 generates the ON-voltage VON or the OFF-voltage VOFF based on the first control signal CS1 and transmits the ON-voltage VON or the OFF-voltage VOFF to the lens module 100. In a 2D mode, the lens module 100 receives an OFF-voltage VOFF from the lens controlling part 420, so that the lens module 100 is not driven as a Fresnel lens. In a 3D stereoscopic mode, the lens module 100 receives an ON-voltage VON from the lens controlling part 420, so that the lens module 100 is driven as a Fresnel lens.

The lens controlling part 420 generates a third control signal CS3 based on the first control signal CS1. The lens controlling part 420 transmits the third control signal CS3 to the light source controlling part 440. The third control signal CS3 is synchronized to the mode. The third control signal CS3 may control a luminance of the light source module 300 according to the mode. For example, in 2D mode, the third control signal CS3 controls the light source module 300 to provide light of a first luminance, while in 3D stereoscopic mode, the third control signal CS3 controls the light source module 300 to provide light of a second luminance brighter than the first luminance.

The timing controlling part 430 transmits the 2D image and the 3D stereoscopic image to the panel module 200. In addition, the timing controlling part 430 generates a data voltage V_DATA, a vertical synchronized signal VS, a horizontal synchronized signal HS, etc., based on the second control signal CS2, and transmits the data voltage V_DATA, the vertical synchronized signal VS, the horizontal synchronized signal HS, etc., to the panel module 200. Thus, the panel module 200 may be driven in either 2D mode or 3D stereoscopic mode.

The light source controlling part 440 generates a first luminance control signal BS1 or a second luminance control signal BS2 based on the third control signal CS3, and transmits the first luminance control signal BS1 and the second luminance control signal BS2 to the light source module 300. Thus, the light source module 300 may generate either the first luminance light or second luminance light based on the first and second luminance control signals BS1 and BS2.

The display apparatus 1000 may further include a spacer substrate (not shown) disposed between the lens panel 500 and the display panel 210 and an optical adhesive (not shown) that adheres the lens panel 500 and the display panel 210 to the spacer substrate. The spacer substrate may maintain a constant distance between the unit lenses LU and the pixel P.

Figure 3:
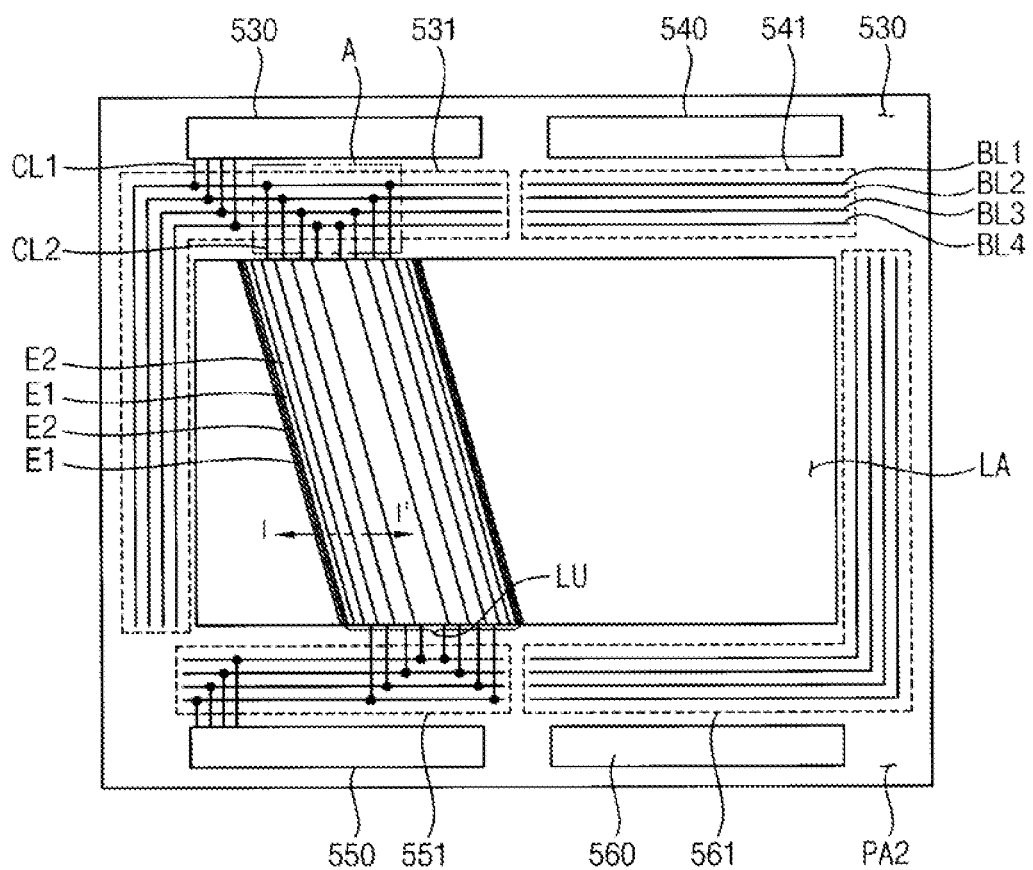
FIG. 3 is a plan view of a lens panel of FIG. 2.
Figure 3:
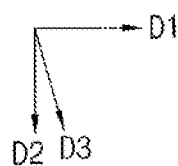
Figure 4:
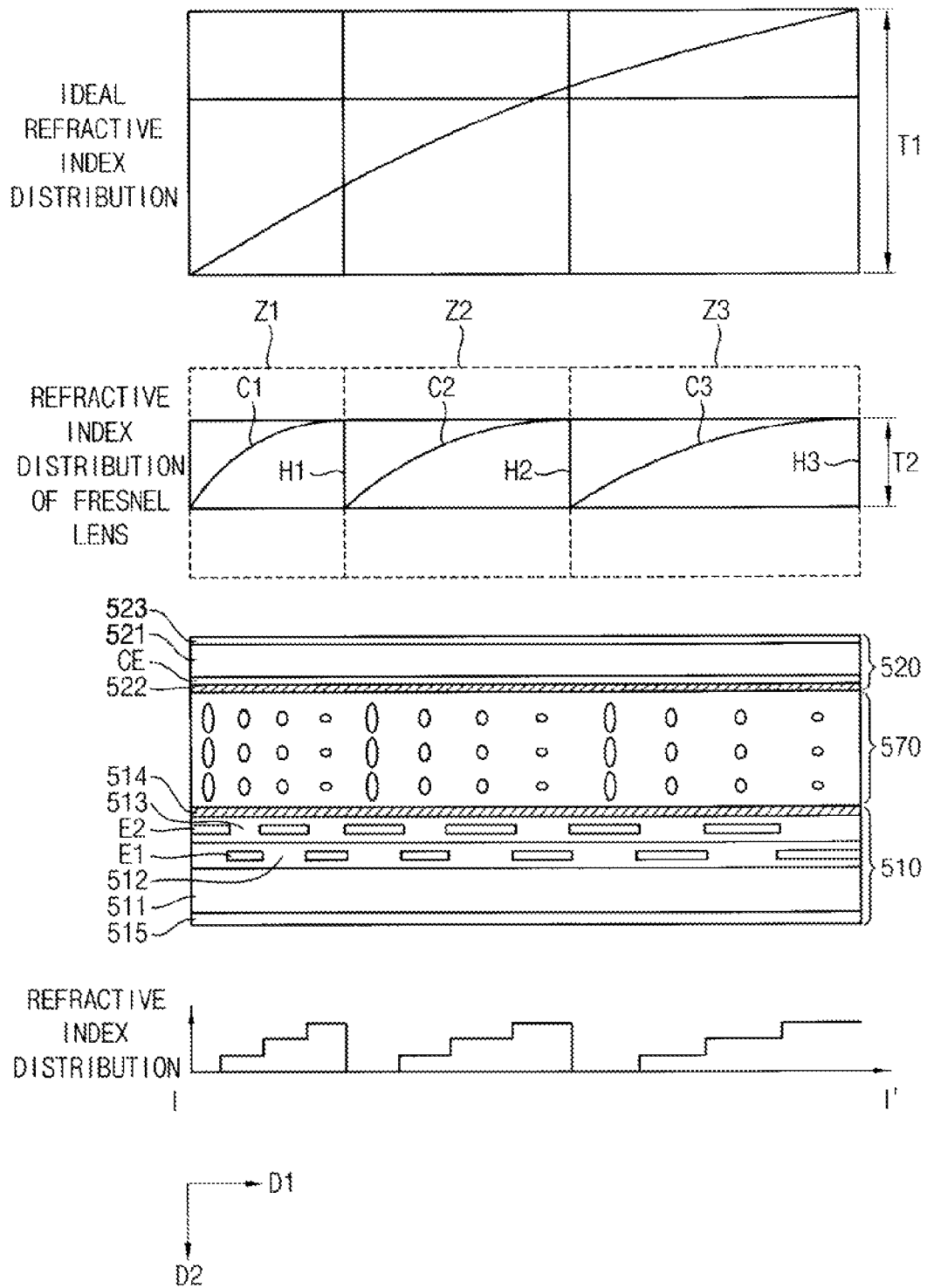
FIG. 4 is a cross-sectional view of a lens panel taken along a line I-I' of FIG. 3.

FIG. 3 is a plan view illustrating a lens panel of FIG. 2. FIG. 4 is a cross-sectional view illustrating a lens panel taken along a line I-I' of FIG. 3. FIG. 4 further includes a conceptual diagram for the unit lens LU and a refractive index profile of the unit lens LU.

Referring to FIG. 3 and FIG. 4, the lens panel 500 includes the first substrate 510, the second substrate 520 opposite to the first substrate 510 and the liquid crystal layer 570 disposed between the first substrate 510 and the second substrate 520.

The first substrate 510 includes a first base substrate 511, a first insulating layer 512 disposed on the first base substrate 511, a plurality of first electrodes E1, a second insulating layer 513 disposed on the first insulating layer 512, and a plurality of second electrodes E2, and a wire part including wire parts 531, 541, 551 and 561.

The first electrodes E1 are disposed on the first insulating layer 512, and the second electrodes E2 are disposed on the second insulating layer 513. Thus, the first electrodes E1 and the second electrodes E2 are disposed on different layers from each other, and are electrically insulated from each other. The first electrodes E1 and the second electrodes E2 are alternately disposed in a zigzag pattern, when viewed from a cross-sectional view, and partially overlap each other. For example, the second electrode E2 corresponds to a portion between adjacent first electrodes E1, and partially overlaps with each adjacent first electrodes E1. In addition, each of the first and second electrodes E1 and E2 may be inclined with respect to a side of the display panel 210 by a predetermined angle substantially parallel with the third direction D3, to prevent moiré patterns.

The first and second electrodes E1 and E2 may include a transparent conductive oxide. For example, the first and second electrodes E1 and E2 may include indium tin oxide (ITO), indium zinc oxide (IZO), etc.

The first and second insulating layers 512 and 513 may include a transparent insulating material. For example, the first and second insulating layers 512 and 513 may include silicon nitride (SiNx), silicon oxide (SiOx), etc. The first insulating layer 512 is disposed on the first base substrate 511 on which the wire part 531, 541, 551 and 561 is disposed, the first electrode E1 is disposed on the first insulating layer 512, the second insulating layer 513 is disposed on the first insulating layer 512 on which the first electrode E1 is disposed, and the second electrode E2 is disposed on the second insulating layer 513.

The first substrate 510 may further include a third insulating layer (not shown) disposed on the second insulating layer 513 on which the second electrode E2 is disposed, a first alignment layer 514 disposed on the third insulating layer, and a polarizing plate 515 disposed under the first base substrate 511. The third insulating layer planarizes an upper surface of the first substrate 510 to uniformly align liquid crystal molecules of the liquid crystal layer 570. The first alignment layer 514 may be rubbed in a third direction D3 substantially parallel with the first and second electrodes E1 and E2. The first polarizing plate 515 may have a polarizing axis substantially parallel with the first and second electrodes E1 and E2.

The second substrate 520 includes a second base substrate 521 and the common electrode CE disposed on the second base substrate 521.

The common electrode CE may include a transparent conductive oxide. For example, the common electrode CE may include indium tin oxide (ITO), indium zinc oxide (IZO), etc. The common electrode CE, along with the first and second electrodes E1 and E2, may rearrange the liquid crystal molecules of the liquid crystal layer 570. Thus, the first and second electrodes E1 and E2, the common electrode CE and the liquid crystal layer 570 form the unit lens LU.

The second substrate 520 may further include a second alignment layer 522 disposed on the common electrode CE and a second polarizing plate 523 disposed on the second base substrate 521 opposite to the common electrode CE. The second alignment layer 522 may be rubbed in the third direction D3 substantially parallel with the first and second electrodes E1 and E2. The second polarizing plate 523 may have a polarizing axis substantially parallel with the first and second electrodes E1 and E2.

The liquid crystal layer 570 may have a thickness of about 2 μm to about 5 μm. The liquid crystal layer 570 is thin, so that the lens panel may quickly change the alignment of the liquid crystal molecules between a 2D mode and a 3D stereoscopic mode. The liquid crystal layer 570 may be aligned by the first and second electrodes E1 and E2 and the common electrode CE to have the refractive index of a Fresnel lens. In other words, the liquid crystal layer 570 as controlled by the first and second electrodes E1 and E2 and the common electrode CE mimics the function of a Fresnel lens.

When a driving voltage is applied to the lens panel 500, voltage potentials are generated between the first and second electrodes E1 and E2 and the common electrode CE that rearrange liquid crystal molecules of the liquid crystal layer 570 disposed between the first and second electrodes E1 and E2. Thus, the unit lens LU may have a substantially same phase difference profile as a Fresnel lens.

For example, an ideal phase delay arc of a unit lens LU is divided by an integer multiple of $2\pi$. The unit lens LU has a phase discontinuity edge which is a boundary between the refractive zones or between the first and second electrode E1 and E2, so that the unit lens LU functions as a Fresnel lens. For example, the ideal phase delay surface may be a convex lens, a spherical lens, a hybrid lens, etc.

A Fresnel lens has a phase delay arc of a convex lens having a first thickness T1, but a Fresnel lens may have a second thickness T2 much less than the first thickness T1. Thus, a cell gap of the liquid crystal layer of the lens panel 100 driven as a Fresnel lens may be decreased to be 1/K of a thickness of a convex lens. Here, K is equal to n/2, where n is the number of the arc surfaces included in the Fresnel lens.

The ideal phase delay arc is divided, to divide the unit lens LU into a plurality of refractive areas Z1, Z2, Z3, . . . , Zn. To determine the refractive index in each of the refractive areas Z1, Z2, Z3, . . . , Zn, each of the refractive areas Z1, Z2, Z3, . . . , Zn may include a plurality of first electrodes E1 and a plurality of second electrodes E2. The unit lens LU is symmetric with respect to a center of the Fresnel lens.

For example, as shown in FIG. 4, the first, second and third refractive areas Z1, Z2 and Z3 may have first, second and third refractive indexes having first, second and third arcs C1, C2, and C3, respectively. In addition, first, second and third discontinuity lines H1, H2 and H3 according to height discontinuities of the first, second and third arcs C1, C2 and C3 are defined at the edges of each of the first to third refractive areas Z1, Z2 and Z3.

As an example, the first refractive area Z1 is disposed by a first edge of the unit lens LU, the third refractive area Z3 is disposed closer to a center of the unit lens LU, and the second refractive area Z3 is disposed between the first refractive area Z1 and the second refractive area Z3.

Widths of the first electrodes E1 of the first refractive area Z1 may be substantially the same as widths of the second electrode E2 of the refractive area Z1. However, widths of the first and second electrodes E1 and E2 of the first refractive area Z1 may differ from widths of the first and second electrodes E1 and E2 of the third refractive area Z3. For example, widths of the first and second electrodes E1 and E2 of the third refractive area Z3 may be greater than widths of the first and second electrodes E1 and E2 of the first refractive area Z1. The width of each of the first and second electrodes E1 and E2 of the first refractive area Z1 may be from about 2 μm to about 3.5 μm. A distance between adjacent first electrodes E1 and a distance between adjacent second electrodes E2 may be about 3 μm.

Alternatively, the first and second electrodes E1 and E2 of the first refractive area Z1 may have substantially the same widths as the first and second electrodes E1 and E2 of the second and third refractive area Z2 and Z3. The number of first and second electrodes E1 and E2 in the second and third refractive area Z2 and Z3 may be greater than of the number of first and second electrodes E1 and E2 in the first refractive area Z1. For example, a width of each of the first and second electrodes E1 and E2 in the first to third refractive areas Z1, Z2 and Z3 may be about 2 μm to about 3.5 μm. Thus, the lens panel 500 may be driven by time-division multiplexing.

As described in FIG. 4, in a 3D stereoscopic mode, first, second, third and fourth voltages having different levels may be applied to consecutive, alternating first and second electrodes in the first direction D1 in the first refractive area Z1. The levels increase from the first voltage to the fourth voltage. Thus, different refractive indexes (or phase indexes) may be consecutively generated in the first refractive area Z1 according to the first to fourth differing voltages. Differences between consecutive refractive indexes may be substantially the same. Thus, the liquid crystal director in the first refractive area Z1 may represent the first arc (C1).

In addition, the first to fourth voltages may be applied to the consecutive first and second electrodes formed in the first direction D1 in the second refractive area Z2 and the consecutive first and second electrodes formed in the first direction D1 in the third refractive area Z3. Thus, the liquid crystal director in the first to third refractive areas Z1, Z2 and Z3 may represent first to third arcs C1, C2 and C3 having the first to third refractive indexes.

A first discontinuity line H1 may occur between the electrode in the first refractive area Z1 to which the fourth voltage is applied and the electrode in the second refractive area Z2 to which the first voltage is applied, and forms the boundary between the adjacent first and second refractive areas Z1 and Z2.

In the 2D mode, a common voltage may be applied to the first and second electrodes E1 and E2 in the first to third refractive areas Z1, Z2 and Z3 to convert a liquid crystal director of the first to third refractive areas Z1, Z2 and Z3 into an initial alignment state.

Unit lenses LU adjacent to each other may share a peripheral electrode. For example, the adjacent unit lenses LU may overlap with each other.

Figure 5:
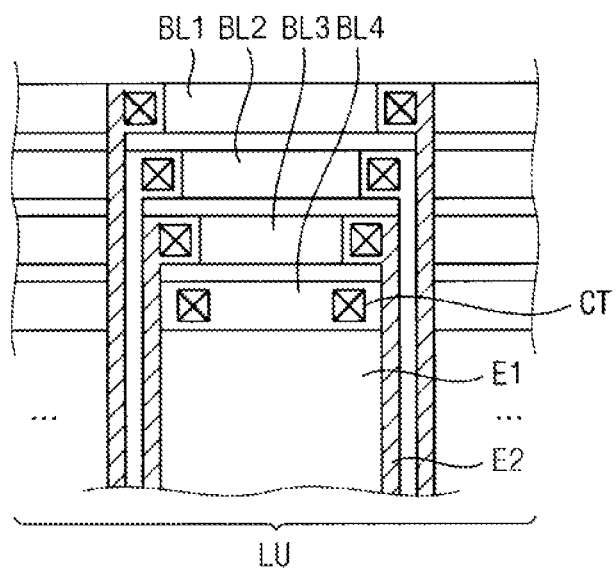
FIG. 5 is an exploded plan view illustrating a portion 'A' of FIG. 3.

FIG. 5 is an exploded plan view illustrating a portion 'A' of FIG. 3.

Referring to FIG. 3 and FIG. 5, the first, second, third and fourth voltages are provided by the wire part disposed between the unit lenses LU and the first, second, third and fourth lens driving circuits 530, 540, 550 and 560. The wire part may include first, second, third and fourth wires 531, 541, 551 and 561. The first and second wire parts 531 and 541 may be disposed in a first peripheral area PA1 between the first and second lens driving circuits 530 and 540 and first ends of the first and second electrodes E1 and E2, and the third and fourth wire parts 551 and 561 may be disposed in a second peripheral area PA2 between the third and fourth lens driving circuits 550 and 560 and second ends of the first and second electrodes E1 and E2.

Each of the first, second, third and fourth wire parts 531, 541, 551 and 561 may include a plurality of bus lines and a plurality of connect lines. For example, each of the first, second, third and fourth wire parts 531, 541, 551 and 561 may include first, second, third and fourth bus lines BL1, BL2, BL3 and BL4 and the first and second connect lines CL1 and CL2. The first, second, third and fourth bus lines BL1, BL2, BL3 and BL4 may extend in the first and second directions D1 and D2 in the peripheral area PA around the lens area LA. The first connect lines CL1 extend in the second direction D2 to electrically connect the first, second, third and fourth lens driving circuits 530, 540, 550 and 560 to the first, second, third and fourth bus lines BL1, BL2, BL3 and BL4. The second connect lines CL2 extend in the second direction D2 to electrically connect the first, second, third and fourth bus lines BL1, BL2, BL3 and BL4 to the first and second electrodes E1 and E2.

The first, second, third and fourth bus lines BL1, BL2, BL3 and BL4 may include copper (Cu), aluminum (Al), etc., which have relatively low resistance and are opaque. The first and second connect lines CL1 and CL2 may include a material that is substantially the same as that of the first to fourth bus lines BL1, BL2, BL3 and BL4 or a material that is substantially the same as that of the first and second electrodes E1 and E2. The second connect lines CL2 may electrically connect the first and second electrodes E1 and E2 to the first to fourth bus lines BL1, BL2, BL3 and BL4 via a contact hole CT.

The first, second, third and fourth bus lines BL1, BL2, BL3 and BL4 may receive differing voltages via the first connect line CL1 from the lens driving circuits 530, 540, 550 and 560, respectively. The first end of the first electrode E1 is connected to one of the first, second, third and fourth bus lines BL1, BL2, BL3 and BL4 of the first wire part 531 via the second connect line CL2, and the second end of the first electrode E1 is connected to the bus line connected to the first end. Thus, both ends of the first electrode E1 receive a substantially equal voltage. In addition, similar to the first electrode E1, both ends of the second electrode E2 are connected to the bus lines having a substantially equal voltage, so that both ends of the second electrode E2 receive a substantially equal voltage. This arrangement may minimize an increase of a voltage drop across the first and second electrode E1 and E2 that may occur as a size of the display apparatus increases.

Each of the first to fourth wire parts 531, 541, 551 and 561 may further include a common bus line (not shown) that applies the common voltage to the first and second electrodes E1 and E2. Applying a common voltage to the first and second electrodes E1 and E2 of the unit lens LU may convert a liquid crystal director of the first to third refractive areas Z1, Z2 and Z3 into an initial alignment state.

According to a present exemplary embodiment, a substantially equal voltage may be applied to both ends of the first and second electrodes E1 and E2 of the unit lens LU to reduce a voltage drop across the first and second electrode E1 and E2.

According to a present exemplary embodiment, a display apparatus includes a lens panel having a refractive index of a Fresnel lens, so that the display apparatus may quickly change between a 2D mode and a 3D stereoscopic mode.

First and second electrodes of a unit lens are driven in a dual bank, to decrease RC delay according to resistances of the first and second electrodes of the unit lens.

In addition, a substantially equal voltage may be applied to both ends of each of the first and second electrodes of the unit lens, to decrease RC delay according to resistances of the first and second electrodes of the unit lens.

In addition, a first luminance may be provided in a 2-dimensional (2D) mode and a different second luminance may be provided in a 3-dimensional (3D) mode, to improve display quality.

In addition, the unit lens is inclined with respect to a side of a display panel, to prevent moirépatterns.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings of the exemplary embodiments. Accordingly, all such modifications are intended to be included within the scope of the exemplary embodiments as defined in the claims. Embodiments of the present disclosure are defined by the following claims, with equivalents of the claims to be included therein.

What is claimed is:

1. A lens module comprising:
a lens panel comprising a first substrate having first electrodes and second electrodes alternately disposed thereon, a second substrate opposite to the first substrate, and a liquid crystal layer disposed between the first substrate and the second substrate, wherein the first and second electrodes are electrically insulated from each other; and
a lens driving part for providing a substantially equal voltage to both ends of each of the first and second electrodes,
wherein the first substrate further comprises a base substrate, a first insulating layer disposed between the first electrode and the second electrode, and a first alignment layer disposed over the first and second electrodes;
the second substrate includes a second alignment layer facing the first alignment layer,
wherein each of the first and second alignment layers is rubbed in a direction substantially parallel with the first and second electrodes, and
the lens panel includes a first polarizing plate disposed under the first substrate and a second polarizing plate disposed over the second substrate, wherein
each of the first and second polarizing plates has a polarizing axis substantially parallel with the first and second electrodes.

2. The lens module of claim 1, wherein the first substrate includes a lens area and a peripheral area surrounding the lens area, and
the first and second electrodes are disposed in the lens area, and extend in a direction inclined with respect to a side of the first substrate, and partially overlap each other, and
wherein the first substrate further comprises a second insulating layer disposed between the first substrate and the first electrode.

3. The lens module of claim 2, wherein the lens driving part is disposed in the peripheral area, and the lens driving part includes
first and second lens driving circuits connected to a first end of each of the first and second electrodes, and
third and fourth lens driving circuits connected to a second end of each of the first and second electrodes opposite to the first end.

4. The lens module of claim 1, wherein the first substrate further includes a plurality of connect lines disposed between the first and second electrodes and the lens driving part that transmit the voltage to both ends of each of the first and second electrodes,
wherein the connect lines provide different voltages to the first and second electrodes in a 3D stereoscopic display mode, and a common voltage to each of the first and second electrodes in a 2D display mode.

5. The lens module of claim 1, wherein the first and second electrodes form a unit lens,
the unit lens includes a plurality of refractive areas, and
widths of the first and second electrodes increase as the refractive areas become closer to a center of the unit lens from an edge of the unit lens.

6. The lens module of claim 1, wherein the first and second electrodes form a unit lens,
the unit lens includes a plurality of refractive areas,
the first and second electrodes have a substantially same width, and
the number of the first and second electrodes decreases as the refractive areas become closer to an edge of the unit lens from a center of the unit lens.

7. A display apparatus comprising:
a panel module adapted to displaying either a 2-dimensional (2D) image or a 3-dimensional (3D) stereoscopic image; and
a lens module disposed over the panel module, the lens module comprising:
a lens panel including a first substrate having first electrodes and second electrodes alternately disposed thereon, a second substrate opposite to the first substrate, and a liquid crystal layer disposed between the first substrate and the second substrate, wherein the first and second electrodes are electrically insulated from each other; and
a lens driving part providing a substantially equal voltage to both ends of each of the first and second electrodes,
wherein the first substrate further comprises a base substrate, a first insulating layer disposed between the first electrodes and the second electrodes, and a first alignment layer disposed over the first and second electrodes;

the second substrate includes a second alignment layer facing the first alignment layer, wherein each of the first and second alignment layers is rubbed in a direction substantially parallel with the first and second electrodes, and the lens panel includes a first polarizing plate disposed under the first substrate and a second polarizing plate disposed over the second substrate, wherein each of the first and second polarizing plates has a polarizing axis substantially parallel with the first and second electrodes.

8. The display apparatus of claim 7, further comprising:
a light source module disposed under the panel module for providing light to the panel module; and
a controller connected to the panel module, the lens module and the light source module for controlling the panel module, the lens module and the light source module, and
wherein the first substrate further comprises a second insulating layer disposed between the first substrate and the first electrodes.

9. The display apparatus of claim 8, wherein the controller comprises:
a timing controlling part for transmitting either the 2D image or the 3D stereoscopic image to the panel module;
a lens controlling part for transmitting different voltage signals according to 2D image data and 3D stereoscopic image data to the lens module; and
a light source controlling part for transmitting a different luminance control signals according to VOFF and VON to the light source module.

10. The display apparatus of claim 9, wherein the lens driving part generates a plurality of voltages having different levels based on VON.

11. The display apparatus of claim 9, wherein
the first luminance control signal controls the light source module to provide light of a first luminance, and
the second luminance control signal controls the light source module to provide light of a second luminance.

12. The display apparatus of claim 9, wherein the lens controlling part for transmitting an ON-voltage (VON) to the lens module when 2D image data is transmitted to the panel module, and for transmitting an OFF-voltage (VOFF) to the lens module when 3D stereoscopic image data is transmitted to the panel module; and
the light source controlling part for transmitting a first luminance control signal to the light source module when VOFF is transmitted to the lens module, and for transmitting a second luminance control signal to the light source module when VON is transmitted to the lens module.

13. The display apparatus of claim 7, wherein the panel module includes a plurality of pixels, each including a switching element, a pixel electrode electrically connected to the switching element and a color filter facing the pixel electrode.

14. The display apparatus of claim 7, wherein the first and second electrodes extend in a direction inclined with respect to a side of the first substrate and form a unit lens,
the unit lens includes a plurality of refractive areas, and
widths of the first and second electrodes increase as the refractive areas become closer to a center of the unit lens from an edge of the unit lens.

15. The display apparatus of claim 7, wherein the first and second electrodes extend in a direction inclined with respect to a side of the first substrate and form a unit lens,
the unit lens includes a plurality of refractive areas,
the first and second electrodes have a same width, and
the number of the first and second electrodes decrease as the refractive areas become closer to an edge of the unit lens from a center of the unit lens.

16. A lens module comprising:
a lens panel comprising a first substrate having first electrodes and second electrodes alternately disposed thereon, a second substrate opposite to the first substrate, and a liquid crystal layer disposed between the first substrate and the second substrate,
wherein the first and second electrodes are electrically insulated from each other, extend in a direction inclined with respect to a side of the first substrate, and form a unit lens that includes a plurality of refractive areas,
wherein the first substrate further comprises a base substrate, a first insulating layer disposed between the first electrodes and the second electrodes, and a first alignment layer disposed over the first and second electrodes;
the second substrate includes a second alignment layer facing the first alignment layer,
wherein each of the first and second alignment layers is rubbed in a direction substantially parallel with the first and second electrodes, and
the lens panel includes a first polarizing plate disposed under the first substrate and a second polarizing plate disposed over the second substrate, wherein
each of the first and second polarizing plates has a polarizing axis substantially parallel with the first and second electrodes.

17. The lens module of claim 16, wherein the first substrate includes a lens area and a peripheral area surrounding the lens area,
wherein the first and second electrodes are disposed in the lens area and partially overlap each other, and
further comprising a lens driving part disposed in the peripheral area that provides a substantially equal voltage to both ends of each of the first and second electrodes, and
wherein the first substrate further comprises a second insulating layer disposed between the first substrate and the first electrodes.

18. The lens module of claim 17, wherein the first substrate further includes a plurality of connect lines disposed between the first and second electrodes and the lens driving part that transmit the voltage to both ends of each of the first and second electrodes,
wherein the connect lines provide different voltages to the first and second electrodes in a 3D stereoscopic display mode, and a common voltage to each of the first and second electrodes in a 2D display mode.

19. The lens module of claim 16, wherein widths of the first and second electrodes increase as the refractive areas become closer to a center of the unit lens from an edge of the unit lens.

20. The lens module of claim 16, wherein the first and second electrodes have a substantially same width, and the number of the first and second electrodes decreases as the refractive areas become closer to an edge of the unit lens from a center of the unit lens.

* * * * *